US012016479B1

(12) United States Patent
Preston

(10) Patent No.: US 12,016,479 B1
(45) Date of Patent: Jun. 25, 2024

(54) SECURE PARCEL DELIVERY RECEPTACLE SYSTEM

(71) Applicant: Debra Preston, Jacksonville, FL (US)

(72) Inventor: Debra Preston, Jacksonville, FL (US)

( * ) Notice: Subject to any disclaimer, the term of this patent is extended or adjusted under 35 U.S.C. 154(b) by 290 days.

(21) Appl. No.: 17/498,534

(22) Filed: Oct. 11, 2021

(51) Int. Cl.
*A47G 29/14* (2006.01)
*G07C 9/00* (2020.01)

(52) U.S. Cl.
CPC ....... *A47G 29/141* (2013.01); *G07C 9/00182* (2013.01)

(58) Field of Classification Search
CPC .................. A47G 29/141; A47G 29/30; A47G 2029/144; A47G 2029/149; G07C 9/00182; G07C 9/00912
USPC ............................................................ 232/44
See application file for complete search history.

(56) References Cited

U.S. PATENT DOCUMENTS 6,612,489 B2* 9/2003 McCormick ......... A47G 29/141 235/382
8,358,199 B2* 1/2013 Nesling .............. G07C 9/00912 340/568.1
10,039,401 B1 8/2018 Romanucci
10,264,906 B2 4/2019 Bloom
10,638,848 B1* 5/2020 Wesley .................. A47C 11/00
10,772,450 B2* 9/2020 Waisanen ................ E05F 15/60
11,160,409 B2* 11/2021 Bowman ................ A47G 29/30
11,172,776 B1* 11/2021 Logan .................... G08B 13/14
11,250,652 B2* 2/2022 Sengstaken, Jr. .. G06K 7/10366
11,324,350 B1* 5/2022 Boggs .................... B65D 81/24
11,478,099 B1* 10/2022 Bates .................. A47G 29/141
11,492,172 B1* 11/2022 Izquierdo ............. A47G 29/141
11,497,335 B2* 11/2022 Romanucci ............ A47G 29/30
11,506,445 B2* 11/2022 Lubben .................. F25D 23/12
11,583,123 B2* 2/2023 Rodgers ............... A47G 29/141
11,759,040 B2* 9/2023 Richardson ........ G06Q 10/0832 705/332
2014/0008246 A1* 1/2014 Pfeiffer .................. A47G 29/14 206/1.5
2017/0251856 A1* 9/2017 Schaible .............. A47G 29/141
2017/0286905 A1* 10/2017 Richardson ............ A47G 29/20
2018/0029760 A1* 2/2018 Maser .................... B65D 43/16
2018/0070753 A1* 3/2018 Eveloff ................. H04W 4/025
2018/0228311 A1* 8/2018 Bloom ............... G07C 9/00912
2019/0000255 A1* 1/2019 Dehner ............ G08B 13/19695
2019/0167025 A1* 6/2019 Cherry ................... A47G 29/16
2019/0231107 A1* 8/2019 Rampton ............. A47G 29/141
2020/0077826 A1* 3/2020 Chenier ............. G07C 9/00912
2020/0121088 A1* 4/2020 Chasnis, II .............. A47C 7/72
2020/0138224 A1* 5/2020 Isreal ..................... A47G 29/22
2020/0138225 A1* 5/2020 Martin ................... B65D 55/02

(Continued)

*Primary Examiner* — William L Miller
(74) *Attorney, Agent, or Firm* — Sanchelima & Associates, P.A.; Christian Sanchelima; Jesus Sanchelima

(57) ABSTRACT

A secure parcel receptacle system includes a box-shaped container having a locking and hinged lid with LED lights positioned on the corners of the lid. Additionally, the lid includes a digital display on the front edge and a handle. The interior of the container includes a plurality of mounting holes in the floor panel. The holes receive a screw or a bolt to effectively couple the receptacle to a ground surface in front of a user's house. Additionally, the digital display of the front edge of the receptacle may serve as a digital bar code which effectively locks and unlocks the hinged lid. In one embodiment, the hinged lid is unlocked when a user inserts a code into the digital bar.

6 Claims, 5 Drawing Sheets

(56) References Cited

U.S. PATENT DOCUMENTS

| | | | | |
|---|---|---|---|---|
| 2020/0163480 | A1* | 5/2020 | Waisanen | A47G 29/141 |
| 2020/0237946 | A1* | 7/2020 | Shell | A61L 2/28 |
| 2020/0268187 | A1* | 8/2020 | Thomas | A47G 29/20 |
| 2020/0390260 | A1* | 12/2020 | Romanucci | A47G 29/30 |
| 2021/0059455 | A1* | 3/2021 | Bowman | B65D 81/18 |
| 2021/0148157 | A1* | 5/2021 | Muniz | G07C 9/00309 |
| 2021/0196071 | A1* | 7/2021 | Gecho | A47G 29/30 |
| 2021/0251409 | A1* | 8/2021 | Kennett | A47G 29/141 |
| 2021/0321807 | A1* | 10/2021 | Needler | G07C 9/00912 |
| 2022/0031104 | A1* | 2/2022 | Rodgers | A47G 29/30 |
| 2022/0061573 | A1* | 3/2022 | Jertberg | A47G 29/20 |
| 2022/0098902 | A1* | 3/2022 | Wong | E05B 65/0075 |
| 2022/0114853 | A1* | 4/2022 | Emde | F25D 29/006 |
| 2022/0142388 | A1* | 5/2022 | Foster | A61L 2/10 |
| 2022/0225810 | A1* | 7/2022 | Mack | G07C 9/20 |
| 2022/0338658 | A1* | 10/2022 | Soderberg | A47G 29/141 |
| 2023/0032389 | A1* | 2/2023 | Barros | B65D 55/028 |
| 2023/0074283 | A1* | 3/2023 | Malcolm | G06Q 10/0836 |
| 2023/0081315 | A1* | 3/2023 | Sebro | A47G 29/141 |
| | | | | 232/38 |

* cited by examiner

SECURE PARCEL DELIVERY RECEPTACLE SYSTEM

BACKGROUND OF THE INVENTION

1. Field of the Invention

The present invention relates to a parcel receptable system and, more particularly, to a secure delivery receptacle system that features a box-shaped container having a locking hinged lid with LED lights and is further secured to a ground surface.

2. Description of the Related Art

Several designs for a parcel receptacle system have been designed in the past. None of them, however, include a secure parcel receptacle system including a box-shaped container having a locking and hinged lid with LED lights positioned on the corners of the lid. Additionally, the lid includes a digital display on the front edge and a handle. The interior of the container includes a plurality of mounting holes in the floor panel. The holes receive a screw or a bolt to effectively couple the receptacle to a ground surface in front of a user's house. Additionally, the digital display of the front edge of the receptacle may serve as a digital bar code which effectively locks and unlocks the hinged lid. In one embodiment, the hinged lid is unlocked when a user inserts a code into the digital bar. It is known that there is a need for delivery receptacles to store parcels in order to prevent the parcel from being stolen. Therefore, there is a need for a receptacle system which stores protects parcels therein.

Applicant believes that a related reference corresponds to U.S. Pat. No. 10,264,906 issued for a delivery package securement device in the form of a box for receiving packages that has an electronic lock that can communicate with a smart phone application. Applicant believes that another related reference corresponds to U.S. Pat. No. 10,039,401 issued for a smart parcel safe. However, the cited references differ from the present invention because they fail to disclose a secure parcel receptacle comprising a box-shaped container having a locking and hinged lid with LED lights positioned on the corners of the lid, wherein the lid includes a digital display on the front edge and a handle.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a secure parcel delivery receptacle system which increases the safety of parcels delivered to a user's home and prevents parcels from being stolen.

It is another object of this invention to provide a secure parcel delivery receptacle system which includes a hinged lid that is locked electronically to prevent any malicious access to the parcels stored within the receptacle.

It is still another object of the present invention to provide a secure parcel delivery receptacle system which gives ease of access to a user by including an electronic lock that may be unlocked by a digital passcode or a mobile device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
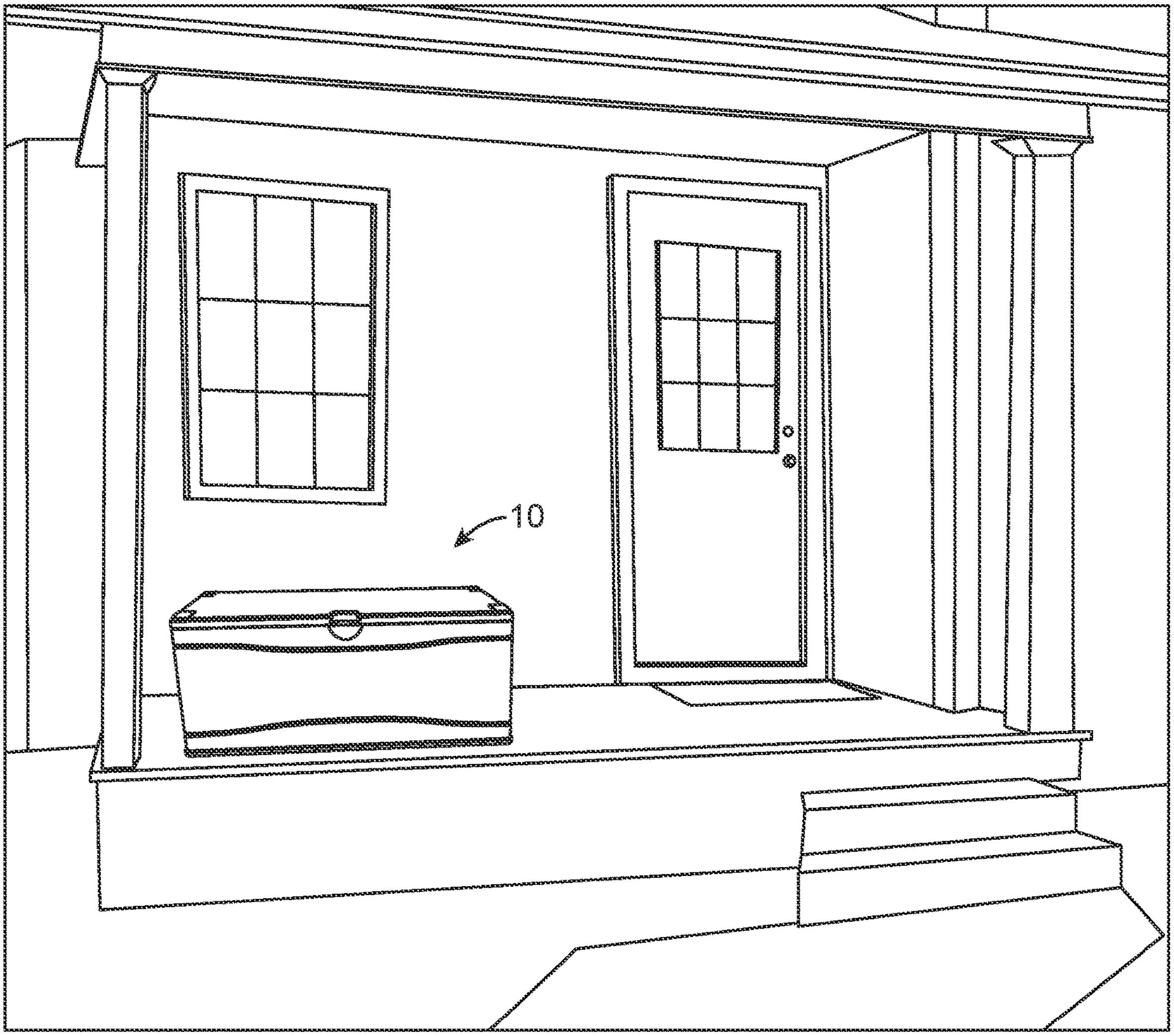
FIG. 1 represents an operational isometric view of parcel delivery receptacle system 10 in accordance with an embodiment of the present invention.

Referring now to the drawings, where the present invention is generally referred to with numeral 10, it can be observed a secure parcel delivery receptacle system 10 which basically includes a body assembly 20 and a lock assembly 40.

Figure 2:
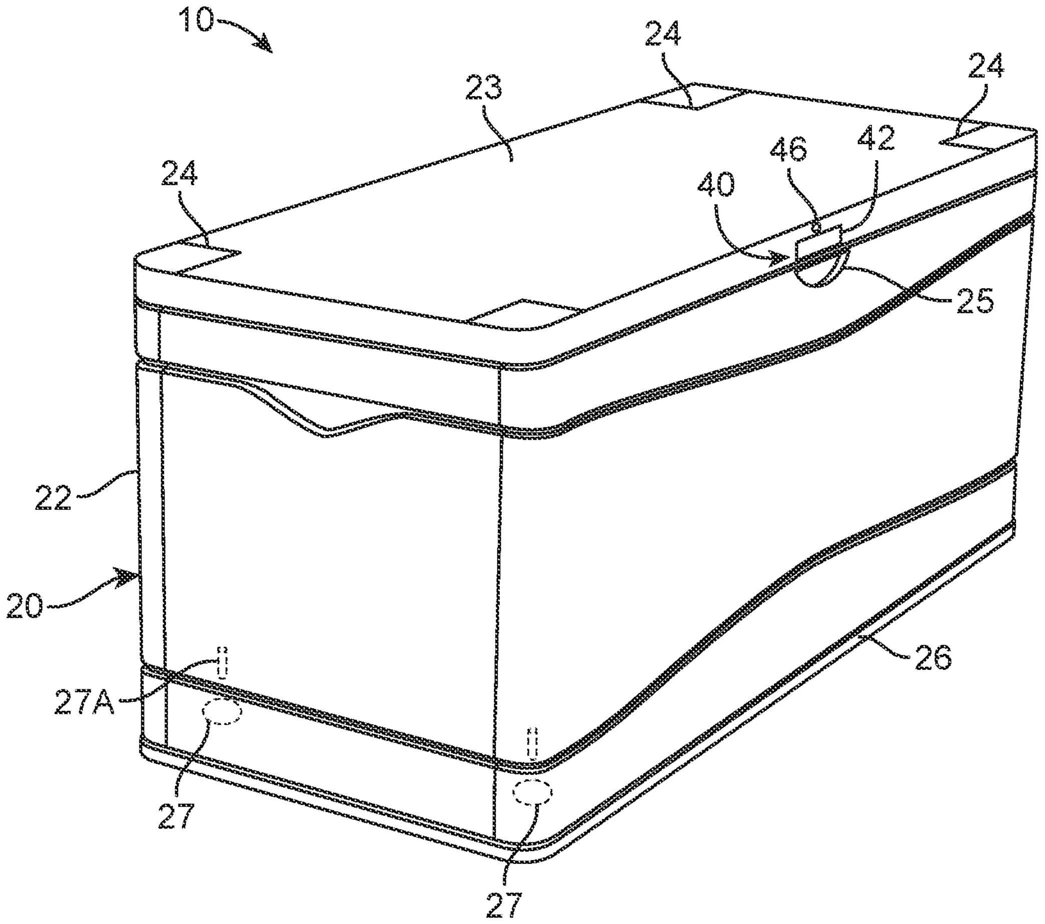
FIG. 2 shows an isometric view of parcel delivery receptacle system 10 having the hinged lid in a locked position in accordance with an embodiment of the present invention.
Figure 3:
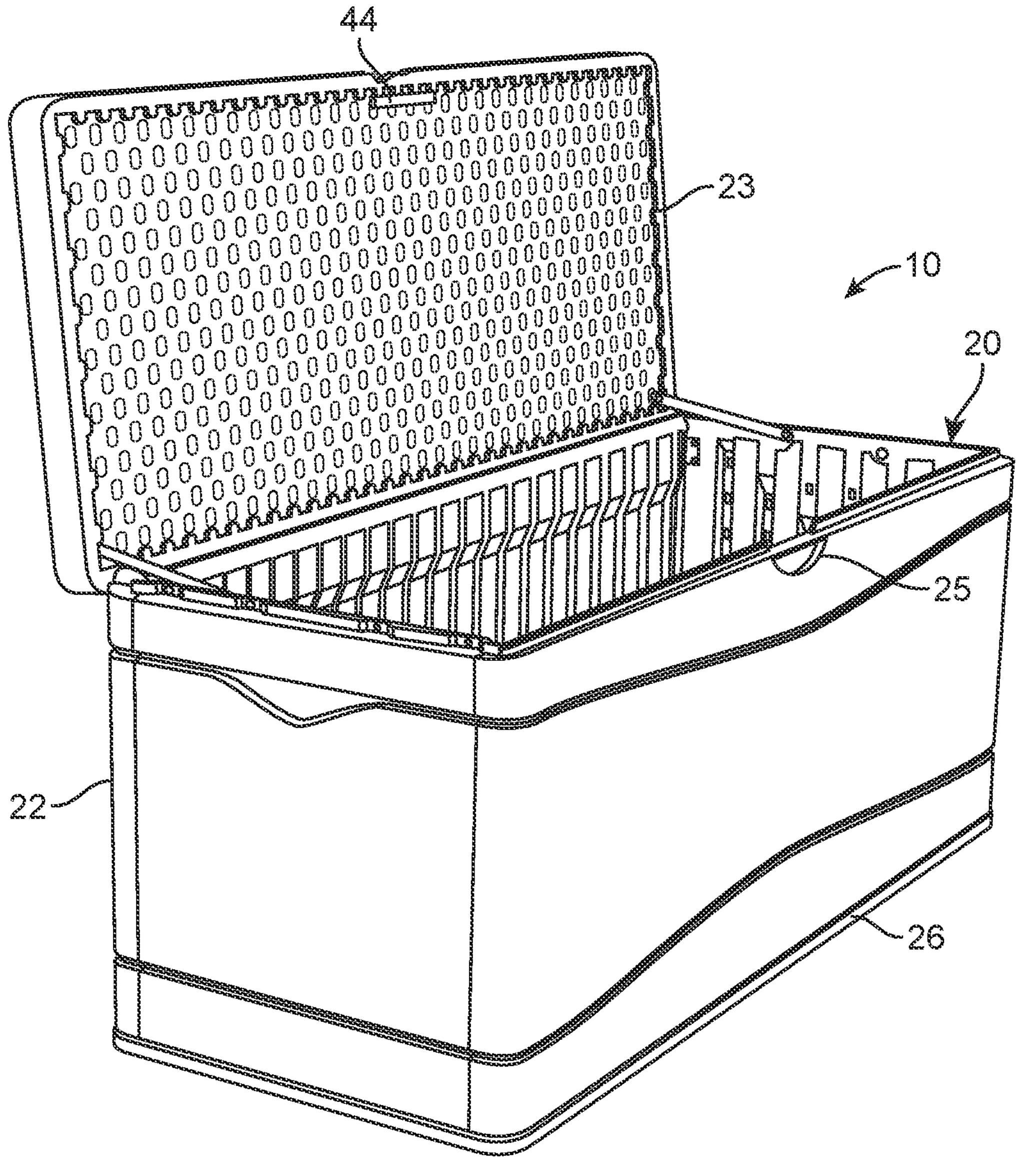
FIG. 3 illustrates an isometric view of parcel delivery receptacle system 10 having the hinged lid in an open position in accordance with an embodiment of the present invention.

Body assembly 20 includes a container 22 as observed in FIGS. 1-3 of the provided drawings. In one embodiment, container 22 is provided as a box shaped container which resembles that of a pool supply container. Container 22 may include two latitudinal sidewalls and two longitudinal sidewalls which form a rectangular box shape. Further, container 22 may be made of a plastic material or a metal material. Container 22 must be made of a weather resistant material to withstand long periods of time outdoors. Additionally, each of the sidewalls are joined together at a floor panel 26 which is positioned to be abutting with a ground surface. In the present embodiment, container 22 is configured to serve as a parcel deliver container. As such, the container 22 is positioned on a porch or in front of a user's house. It should be positioned on a location which is easily accessible to a delivery man.

Body assembly 20 further includes a hinged lid 23 which is hingedly coupled to container 22. In one embodiment, hinged lid 23 includes a rectangular shape with corresponds to the rectangular shape of container 22. Hinged lid 23 is hingedly opened to reveal an open top end and provide access to an interior space of the container 22. The interior space of the container 22 is configured to store and receive a plurality of parcels therein. In the present embodiment, container 22 may hold up to four parcels. However, the dimensions of container 22 may be modified to store additional parcels. Body assembly 20 further includes light emitting diode (LED) lights 24 which are positioned on the hinged lid. In one implementation, LED lights 24 are positioned on each of the four corners of a top end of the hinged lid 23. In one implementation, the LED lights 24 serve as an indicator regarding the parcels that are stored within the container 22. LED lights 24 may be provided as a green light to indicate that there is a parcel located within container 22. Additionally, LED lights 24 may be provided as red lights to indicate that the container 22 is empty and there is no parcel therein. In another embodiment, LED lights 24 may also be provided as yellow lights to indicate that there was an attempted unauthorized attempt to access the parcels within container 22.

Figure 4:
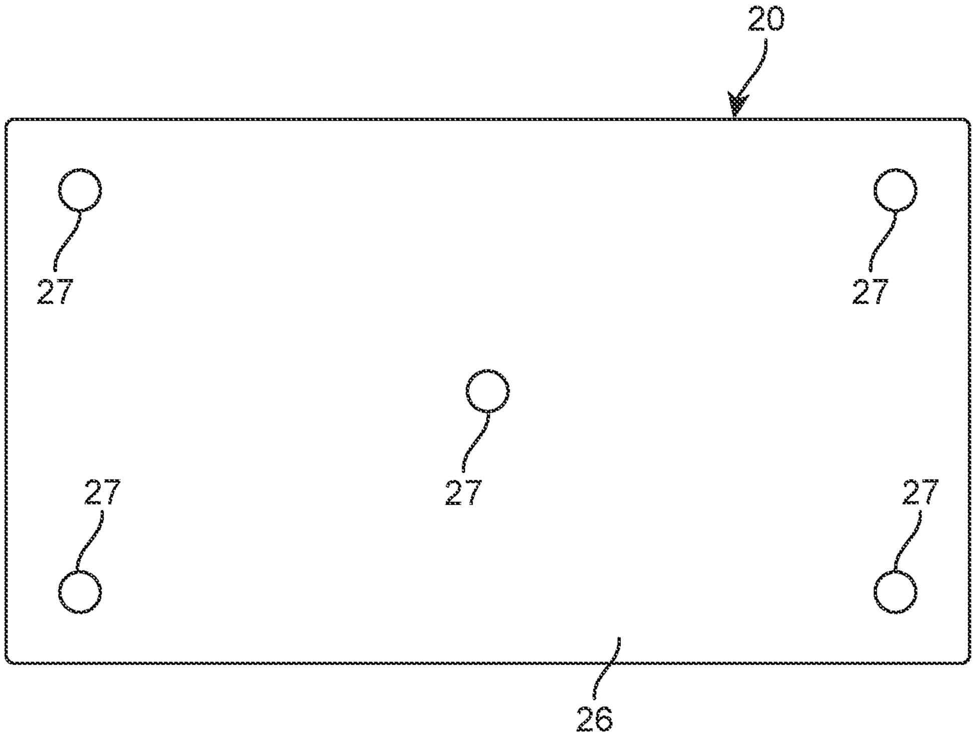
FIG. 4 is a representation of a bottom view of the receptacle system 10 showing the configuration of the apertures which receive the bolts or nuts in accordance with an embodiment of the present invention.

Body assembly 20 further includes a handle 25 which is located along the front sidewall of container 22. Handle 25 is provided as a cavity on the front end of the container 22 to provide easy access to the hinged lid 23. The user may then lift hinged lid 23 by way of handle 25. In another embodiment, handle 25 is provided as a handle member structure which protrudes outwardly from the container 22 and further provides a user with easy access to the hinged lid 23. As observed in FIG. 4, floor panel 26 includes a plurality of mounting holes 27 which receive screws 27A therein. In on embodiment, mounting holes 27 are located along each of the four corners of the floor panel 26 in addition to a middle portion of the floor panel 26. Mounting holes 27 are circular openings which are suitable to receive screws 27A. As observed in FIG. 2, screws 27A are received from the interior of the container 22 to then be coupled to a ground surface. This structure prevents any malicious transportation of the container 22 in an attempt to steal any of the parcels from within container 22.

Lock assembly 40 includes a digital display 42 which is depicted in FIG. 2 of the provided drawings. In one embodiment, digital display 42 is provided as a touch screen LED display. Digital display 42 is positioned along a front edge of the hinged lid 23. In the present implementation, digital display 42 will display a passcode input display which enables a user to input a numerical passcode to unlock the hinged lid 23 from the container 22. Further, digital display 42 may also be configured to deliver notifications to a user approaching container 22. In one embodiment, digital display 42 notifies a user if there is a parcel present within container 22. Further, digital display 42 may also notify a user if there as been an attempted unauthorized access to the interior of container 22.

Lock assembly 40 further includes a lock 44 which is located along a bottom side of the front edge of the hinged lid 23. In one embodiment, lock 44 is provided as an electronic lock which unlocks with the corresponding passcode which is inputted to the digital display 44. As such, lock 44 is communicably coupled to the digital display 42. Lock 44 abuttingly engages with a top edge of container 22 to effectively lock hinged lid 23 to container 22.

Lock assembly 40 further includes a communication module 46 positioned along the front edge of the hinged lid 23. In one embodiment, communication module 46 is communication hardware which enables the lock 44 and the digital display 42 to be in wireless communication with a mobile device. The wireless communication may be facilitated by an communication network such as WiFi, 5G, LTE, Bluetooth, and other wireless communication network means. In one implementation, a user is able to unlock and lock hinged lid 23 by way of their mobile device. In another implementation, the mobile device is provided with notifications to alert a user regarding the parcels that are held within the container 22. The alert may notify a user that the container is empty or contains a parcel therein. In yet another implementation, the mobile device is provided with notifications regarding any malicious attempt to access the parcels held within container 22. Communication module 46 may also automatically contact local law enforcement upon the detection of unauthorized access to the interior of container 22.

Figure 5:
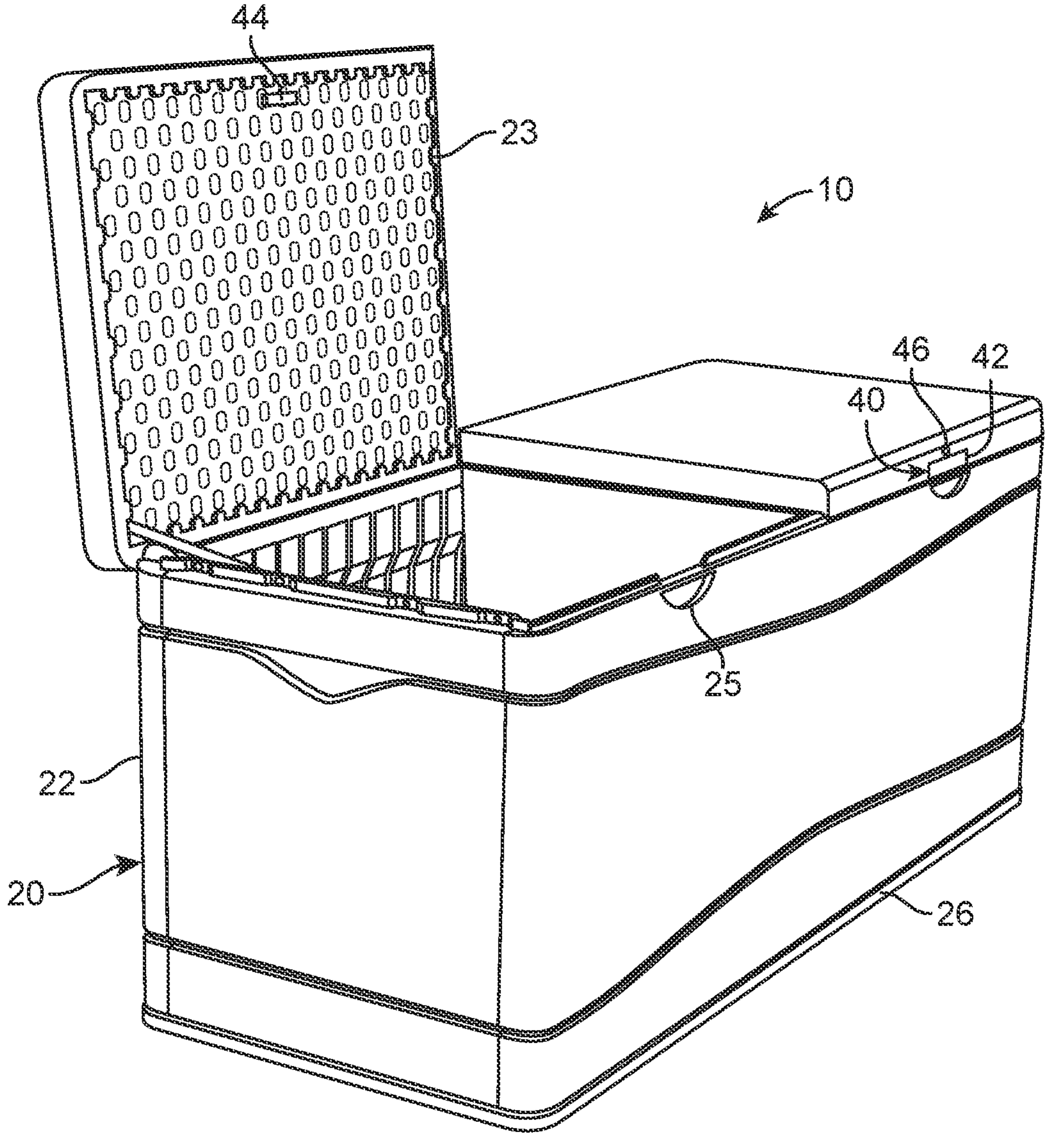
FIG. 5 shows an isometric view of receptacle system 10 depicting another embodiment of the present invention having the receptacle divided into two independent compartments.

FIG. 5 depicts an embodiment of the invention that includes a receptacle having at least two independent compartments. In the present embodiment, hinged lid 23 is divided into at least two independent lid sections which cover a portion of the container 22. Additionally, the interior portion of the container 22 is provided with a divider corresponding to the two independent lid sections of the hinged lid 23. As a result, body assembly 20 comprises two independent compartment sections that each contain a lock assembly 40 to provide access therein. In the present embodiment, multiple compartments prevent the packages being delivered and supplied into the receptacle to be stolen by another party which may be delivering a package. Each of the compartments receive a respective package thereby providing the maximum security for each package delivered. It should be understood that other embodiments of the invention may include more than two independent compartments.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A secure parcel delivery receptacle system, comprising:

a) a body assembly including a container having an open top end and a floor panel, wherein said container includes a hinged lid being hingedly coupled to a side edge of said container, said hinged lid having a shape corresponding to said open top end of said container, said hinged lid including LED lights positioned on a top end thereof, wherein said container further includes a handle located on a front panel of said container, wherein said floor panel includes a plurality of mounting holes thereon which receive a screw therethrough, wherein four out of five mounting holes from the plurality of mounting holes are positioned along four corners of said floor panel, wherein one of said five mounting holes are positioned along a middle portion of the floor panel, wherein said LED lights are positioned along four corners of said top end of said hinged lid, wherein said LED lights include at least a green light, a red light and a yellow light, wherein said green light illuminates when a parcel is located within said container, said red light illuminates when said container is empty; and b) a lock assembly including a digital display and a wireless communication module positioned on a front edge of the hinged lid, wherein said lock assembly includes a lock positioned along a bottom end of the front edge to abuttingly engage with a top edge of the container and effectively lock the hinged lid to the container, wherein said digital display is an interactive LED touch screen display to introduce a passcode of said lock, wherein said digital display is configured to display if said parcel is presented within said container, wherein said wireless communication module is in wireless communication with a mobile device, wherein said hinged lid unlocks upon the input of said passcode to the digital display, wherein said wireless communication module provides with notifications to said mobile device alert if the container is empty, contains said parcel therein or if said lock is being forced, wherein said wireless communication module is configured to alert a local law enforcement upon detecting unauthorized access to the container, wherein said yellow light illuminates if said lock is being forced.

2. The secure parcel delivery receptacle system of claim 1 wherein said container is rectangular in shape.

3. The secure parcel delivery receptacle system of claim 1 wherein said container is abuttingly engaged to a ground surface.

4. The secure parcel delivery receptacle system of claim 1 wherein said handle is a cavity on the container.

5. The secure parcel delivery receptacle system of claim 1 wherein said lock is an electronic lock.

6. A secure parcel delivery receptacle system, consisting of:

a) a ground surface in front of a housing structure;

b) a body assembly including a container with a rectangular shape having an open top end and a floor panel to form a box structure, wherein said container has a lining portion extending about a top end of said container, wherein said container includes a hinged lid being hingedly coupled to a side edge of said container, said hinged lid having a rectangular shape corresponding to said open top end of said container, said hinged lid including four LED lights positioned on four corners of a top end thereof, wherein said LED lights includes at least a green light, a red light and a yellow light, wherein said green light illuminates when a parcel is located within said container, said red light illuminates when said container is empty, wherein said container further includes a handle in the form of a semicircular cavity located on a front panel of said container, wherein said floor panel includes five mounting holes thereon which receive a screw therethrough, wherein four of said five mounting holes are positioned along four corners of said floor panel, wherein one of said five mounting holes are positioned along a middle portion of the floor panel, wherein said floor panel is positioned on the ground surface, said screw being inserted through said mounting holes to engage with said ground surface; and c) a lock assembly including a digital display in the form of an LED touch screen display and a wireless communication module positioned on a front edge of the hinged lid, wherein said digital display includes an electronic passcode, wherein said lock assembly includes an electronic lock positioned along a bottom end of the front edge to abuttingly engage with a top edge of the container and effectively lock the hinged lid to the container, wherein said wireless communication module is in wireless communication with a mobile device, wherein said hinged lid unlocks upon the input of said electronic passcode to the digital display, wherein said digital display is configured to notify if said parcel is presented within said container, wherein said wireless communication module provides notifications to said mobile device to alert if the container is empty, contains said parcel therein or if said lock is being forced, wherein said wireless communication module is configured to alert a local law enforcement upon detecting unauthorized access to the container, wherein said yellow light illuminates if said lock is being forced.

* * * * *